(12) United States Patent
Kawabata (10) Patent No.: US 10,090,882 B2
(45) Date of Patent: Oct. 2, 2018

(54) APPARATUS SUPPRESSING ACOUSTIC ECHO SIGNALS FROM A NEAR-END INPUT SIGNAL BY ESTIMATED-ECHO SIGNALS AND A METHOD THEREFOR

(71) Applicant: Oki Electric Industry Co., Ltd., Tokyo (JP)

(72) Inventor: Naoya Kawabata, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 825 days.

(21) Appl. No.: 14/575,328

(22) Filed: Dec. 18, 2014

(65) Prior Publication Data
US 2015/0249885 A1 Sep. 3, 2015

(30) Foreign Application Priority Data
Feb. 28, 2014 (JP) ................................. 2014-038701

(51) Int. Cl.
*H04B 3/23* (2006.01)
*H04R 3/02* (2006.01)

(52) U.S. Cl.
CPC ............... *H04B 3/231* (2013.01); *H04B 3/23* (2013.01); *H04R 3/02* (2013.01)

(58) Field of Classification Search
CPC .............................. H04B 3/321; H04M 9/082
USPC ....... 348/14.01; 379/388.04, 406.01, 406.05, 379/406.08; 381/59, 66, 71.1, 73.1, 94.1; 700/67; 704/233, 225; 370/351, 201, 370/286, 290; 375/227
See application file for complete search history.

(56) References Cited

U.S. PATENT DOCUMENTS

| | | | | |
|---|---|---|---|---|
| 5,410,595 | A * | 4/1995 | Park ........................ | H04M 9/08 379/406.08 |
| 6,160,886 | A * | 12/2000 | Romesburg ........... | H04M 9/082 379/406.05 |
| 6,678,254 | B1 * | 1/2004 | Song ...................... | H04B 3/234 370/289 |

(Continued)

OTHER PUBLICATIONS

C. Faller, et al., "Estimating the Delay and Coloration Effect of the Acoustic Echo Path for Low Complexity Echo Suppression", Proc. IWAENC2005 ( 2005 International Workshop on Acoutstic Echo and Noise Control), pp. 53-56, Oct. 2005.

*Primary Examiner* — Gerald Gauthier
(74) *Attorney, Agent, or Firm* — Rabin & Berdo, P.C.

(57) ABSTRACT

In an echo suppressing apparatus suppressing from a near-end input signal acoustic echo signals caused by a far-end signal, an estimated-echo path characteristic is multiplied by a far-end signal to produce an estimated-echo signal for each frame, and frames of the estimated-echo signals thus obtained are stored in an estimated-echo signal storage. A delay amount estimator calculates the total of differences between the near-end input signal and each estimated-echo signal thus stored, and determines the amount of frame delay having its total of differences minimal. A delay estimated-echo signal calculator uses the amount of frame delay to read out an optimum frame and near frames respectively preceding and following the optimum frame and to calculate a corrected, delay estimated-echo signal. An echo suppressor uses the estimated-echo signal thus corrected to suppress the acoustic echo signals from the near-end input signal.

5 Claims, 5 Drawing Sheets

(56) References Cited

U.S. PATENT DOCUMENTS

| | | | | |
|---|---|---|---|---|
| 7,251,213 B2* | 7/2007 | Chen | H04B 3/23 370/201 |
| 7,333,447 B2* | 2/2008 | LeBlanc | H04M 9/082 370/286 |
| 7,809,129 B2* | 10/2010 | Wu | H04M 9/082 370/201 |
| 8,180,064 B1 | 5/2012 | Avendano | G10L 21/0232 381/71.1 |
| 8,199,927 B1* | 6/2012 | Raftery | H04M 9/082 370/286 |
| 8,335,685 B2* | 12/2012 | Hetherington | G10L 25/78 704/201 |
| 8,351,597 B2* | 1/2013 | Sato | H04M 9/082 379/390.01 |
| 8,976,715 B2* | 3/2015 | LeBlanc | H04M 9/082 370/291 |
| 9,270,830 B2* | 2/2016 | Rabipour | H04L 43/0841 |
| 2002/0101982 A1* | 8/2002 | Elabd | H04B 3/23 379/406.01 |
| 2003/0149495 A1* | 8/2003 | Hodges | H04M 9/08 700/67 |
| 2004/0120510 A1* | 6/2004 | LeBlanc | H04M 9/082 379/406.01 |
| 2005/0117561 A1* | 6/2005 | Hubert Van Den Bogaert | H04L 1/0002 370/351 |
| 2006/0018457 A1* | 1/2006 | Unno | H04M 9/082 379/388.04 |
| 2006/0018458 A1* | 1/2006 | McCree | H04M 9/082 379/406.01 |
| 2007/0036343 A1* | 2/2007 | Sudo | H04M 9/082 379/406.01 |
| 2008/0170706 A1* | 7/2008 | Faller | H04M 9/082 381/59 |
| 2011/0019831 A1* | 1/2011 | Liu | H04M 9/082 381/66 |
| 2011/0019833 A1* | 1/2011 | Kuech | H04M 9/082 381/66 |
| 2011/0150067 A1* | 6/2011 | Takada | H04M 9/082 375/227 |
| 2011/0176687 A1* | 7/2011 | Birkenes | H04M 9/085 381/66 |
| 2013/0002797 A1* | 1/2013 | Thapa | H04M 3/002 348/14.01 |
| 2013/0216057 A1* | 8/2013 | Thyssen | H04M 9/082 381/66 |
| 2014/0278397 A1* | 9/2014 | Chen | G10L 21/02 704/233 |
| 2014/0286497 A1* | 9/2014 | Thyssen | H04R 3/005 381/66 |
| 2014/0334631 A1* | 11/2014 | de Vicente Pena | G10K 11/16 381/71.1 |
| 2015/0086006 A1* | 3/2015 | Kawabata | H04M 9/082 379/406.05 |
| 2015/0112672 A1* | 4/2015 | Giacobello | H04M 9/082 704/233 |
| 2015/0249885 A1* | 9/2015 | Kawabata | H04B 3/231 381/66 |

* cited by examiner

APPARATUS SUPPRESSING ACOUSTIC ECHO SIGNALS FROM A NEAR-END INPUT SIGNAL BY ESTIMATED-ECHO SIGNALS AND A METHOD THEREFOR

BACKGROUND OF THE INVENTION

Field of the Invention

The present invention relates to an echo-suppressing apparatus, and more particularly to an echo-suppressing apparatus applicable to video teleconference systems and telephone conference systems. The present invention also relates to a method in an echo-suppressing apparatus.

Description of the Background Art

For example, in conventional loudspeaker-assisted conference systems such as a video conference system or telephone conference system, there may arise acoustic echo signals caused by part of sound, including acoustic effects and voices, which has radiated from loudspeakers to be caught by microphones to return to the talker. Since acoustic echo signals may severely hinder the quality of telephonic speech, many researches and developments have been heretofore conducted to work out solutions for suppressing such acoustic echo signals.

Conventionally, one of the solutions for suppressing acoustic echo signals is to use an echo suppressor. Echo suppressors are devices suppressing acoustic echo signals by calculating echo path characteristics, estimated-echo signals and echo suppression gain from a far-end signal and a near-end input signal, and multiplying the near-end input signal by the echo suppression gain. A solution for suppressing acoustic echo signals by using such an echo suppressor is proposed in C. Faller, et al., "Estimating the Delay and Coloration Effect of the Acoustic Echo Path for Low Complexity Echo Suppression", Proc. IWAENC2005 (2005 International Workshop on Acoustic Echo and Noise Control), pp. 53-56, October 2005.

In the echo suppressor disclosed in C. Faller et al., an echo path characteristic is obtained based on far-end signals and near-end input signals of past frames. The obtained echo path characteristic is multiplied by the far-end signal to thereby produce an estimated-echo signal. The echo suppressor also obtains an echo suppression gain based on the near-end input signal and estimated-echo signal, and multiplies the near-end input signal by the echo suppression gain, thus suppressing acoustic echo signals.

More specifically, the echo-suppressing apparatus set forth in C. Faller et al., may be connected to a telecommunications network such as an Internet protocol (IP) network and/or over radio waves to a wireless network such as cellular phone network. From a party on the phone on the far-end side, a far-end signal is received in the form of acoustic digital signal over the telecommunications network.

The far-end signal thus received is in turn converted into a corresponding analog acoustic signal, which is fed to a loudspeaker. The loudspeaker emits the analog acoustic signal as audible sound to the near-end, or local, environment.

The echo-suppressing apparatus of C. Faller et al., has a microphone interconnected, which may catch sound that includes, e.g. speech uttered by a talker on the near-end side, environmental sounds and acoustic echo to produce an analog sound signal. Such acoustic echo may be caused by, e.g. part of analog sound outputted from the loudspeaker and propagating over the space around the near-end side to the microphone. The analog sound signal produced by the microphone is converted into a corresponding digital sound signal, which is in turn supplied to a near-end signal frequency analyzer. The near-end signal frequency analyzer converts the digital sound signal, i.e. near-end input signal, into a frequency-domain signal, which represents the frequency spectrum of the near-end input signal.

The echo-suppressing apparatus of C. Faller et al., also includes a far-end signal frequency analyzer, which converts the far-end signal thus received from the far-end party into a frequency-domain signal representing the frequency spectrum of the far-end signal. In the apparatus, from the frequency spectra of the far-end signal and the near-end input signal thus obtained, acoustic coupling amount is calculated to estimate echo path characteristic. In turn, based on the frequency spectrum of the far-end signal and the estimated-echo path characteristic, an estimated-echo signal is calculated out. From the estimated-echo signal and the frequency spectrum of the near-end input signal, an echo suppressor gain is calculated.

Then, the frequency spectrum of the near-end input signal is multiplied by the echo suppression gain, so that the frequency spectrum of a signal having its acoustic echo suppressed is produced. The latter signal represents the frequency spectrum of the near-end output signal.

The frequency spectrum of the near-end output signal, which is in the frequency domain, is converted into a digital sound signal in the time domain. The resultant near-end output signal, in the time domain, is transmitted to the party on the phone on the far-end side over the network to which the apparatus is connected.

However, if the echo-suppressing apparatus of C. Faller et al., is used with a telephonic device, such as a softphone or smart phone, having a buffer in its input/output section, the acoustic echo signal may not be suppressed for the following reason. In softphones and smart phones, in addition to the echo suppression, various types of processing are performed on, e.g. applications, programs and control signals. If the load on the processing becomes increasing, some of the operations may halt processing such as storing or reading out sound data in or from the buffer, thus causing the delay in speech transmission to be increased and thus fluctuant.

In addition, the echo-suppressing apparatus of C. Faller et al., performs processing in the frequency domain, which requires a frame-by-frame operation in order to conduct the frequency domain conversion.

In the frame-by-frame operation, if every signal could be converted at the same timing into the frequency domain, the valleys in the frequency characteristic of an acoustic echo signal included in a sound signal on the near-end side would then coincide with the valleys in the frequency characteristic of an estimated-echo signal obtained from the far-end signal and estimated-echo path characteristic so as to allow acoustic echo signals to be suppressed.

In practice, however, the amount of delay may fluctuate because of the echo path characteristic, on the near-end side, and the buffer of the input/output section, thus making it difficult to convert the time domain to the frequency domain at the coinciding timing. More specifically, the valleys in the frequency characteristic of the acoustic echo signal included in the sound signal on the near-end side may shift, although slightly, from the valleys in the frequency characteristic of the estimated-echo signal obtained from the far-end signal and echo path characteristic, so that the echo suppression gain increases at the valley of the frequency characteristic, even though the amount of delay is correct, to the extent that the acoustic echo signal corresponding to the valleys could not be suppressed.

In this way, the echo-suppressing apparatus of C. Faller et al., when used with a device having a possibility of large amount of delay extensively fluctuating, would cause the flame-by-flame processing to influence the shift of the valleys in frequency characteristic between the acoustic echo signal and estimated-echo signal. Hence, the acoustic echo signal cannot be suppressed in the valleys.

SUMMARY OF THE INVENTION

It is an object of the present invention to provide an echo-suppressing apparatus and a method therefor which can stably suppress acoustic echo signals independently of the amount of delay or frame-by-frame processing.

In accordance with a first aspect of the present invention, an echo-suppressing apparatus comprises: an estimated-echo signal storage storing therein a plurality of frames of estimated-echo signals, each of which is obtained by multiplying an echo path characteristic estimated one frame earlier by a far-end signal for each frame on a time sequence; a frame delay amount estimator calculating the total of differences between the near-end input signal and each of the estimated-echo signals stored in the estimated-echo signal storage, and determining the amount of frame delay having the total of differences minimal; a delay estimated-echo signal calculator using the amount of frame delay to read out an optimum frame and a near frame preceding or following the optimum frame for calculating a corrected, estimated-echo signal; and an echo suppressor using the corrected, estimated-echo signal for suppressing the acoustic echo signal from the near-end input signal.

In accordance with a second aspect of the present invention, a method of suppressing from a near-end input signal an acoustic echo signal caused by part of a far-end signal comprises: multiplying the far-end signal by an path characteristic estimated one frame earlier to produce an estimated-echo signal for each frame on a time sequence, and holding a plurality of frames of the estimated-echo signal by an estimated-echo signal storage; calculating by a frame delay amount estimator the total of differences between the near-end input signal and the estimated-echo signals held in the estimated-echo signal storage for each frame, and obtaining the amount of frame delay having the total of differences minimal; using the amount of frame delay to readout an optimum frame and a near frame preceding or following the optimum frame by an estimated-echo signal calculator, and calculate a corrected, estimated-echo signal; and using the estimated-echo signal thus corrected by the estimated-echo calculator to suppress the acoustic echo signal from the near-end input signal by an echo suppressor.

According to the present invention, it is possible to provide an echo-suppressing apparatus which makes inter-frame corrections by using plural frames of estimated-echo signal to correct an estimated-echo signal, and which stably suppresses acoustic echo signals independently of the amount of delay or frame-by-frame processing.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

An illustrative embodiment of the echo-suppressing apparatus according to the present invention will be described in detail with reference first to FIGS. 1A and 1B. In the illustrative embodiment, the present invention is applied to an echo-suppressing apparatus 100 for use in a sound signal transmitter/receiver included in a loudspeaker-assisted conference system 10, which may be, for example, a video teleconference system or telephone conference system. Throughout the present specification and drawings, like components may be designated with the same reference numerals and their repetitive description may be refrained from.

Figures 1, 1A:
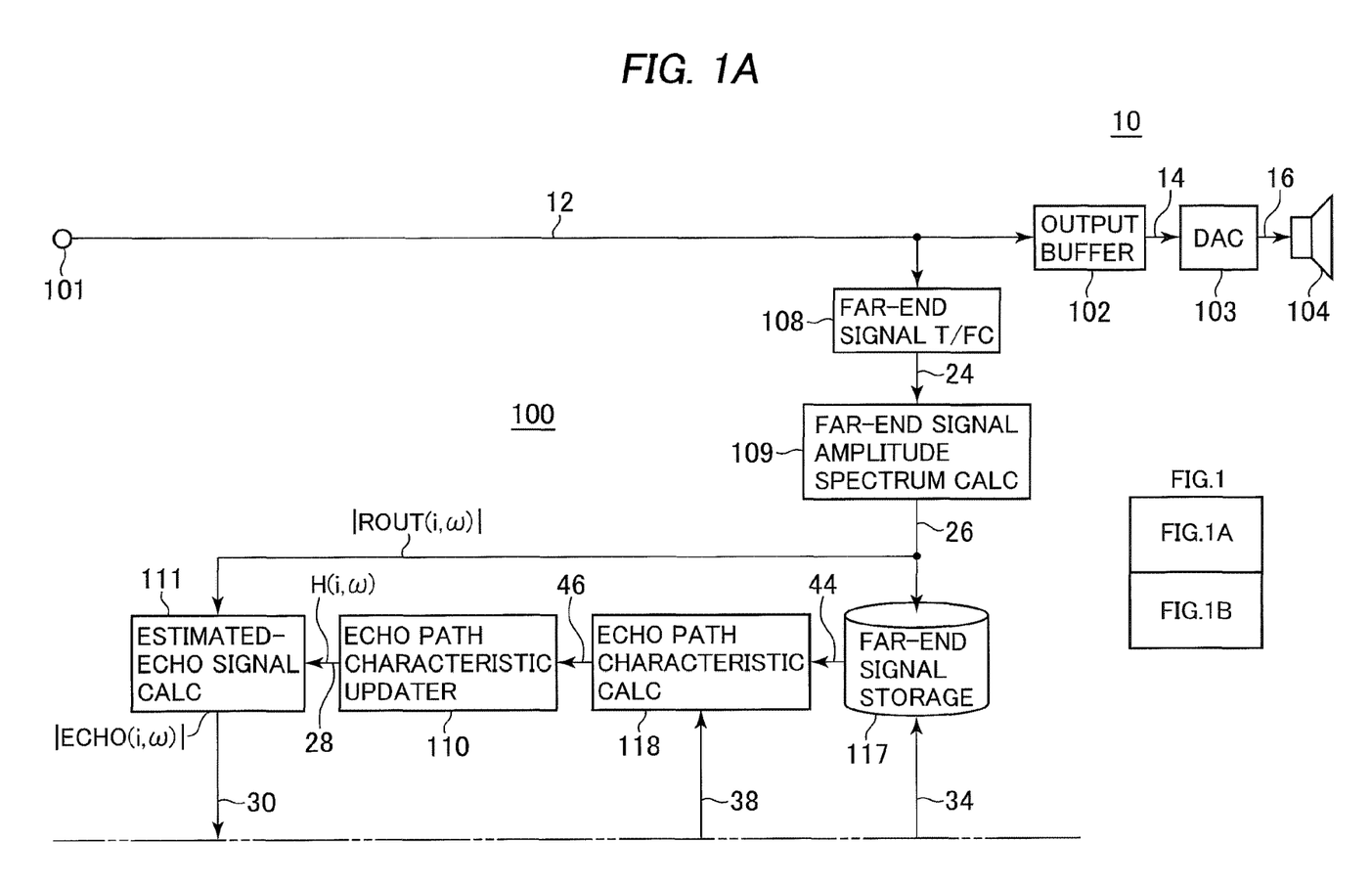
FIGS. 1A and 1B, when combined as shown in FIG. 1, schematically show, in a block diagram, the configuration of an echo-suppressing apparatus in accordance with an illustrative embodiment of the present invention.
Figure 1B:
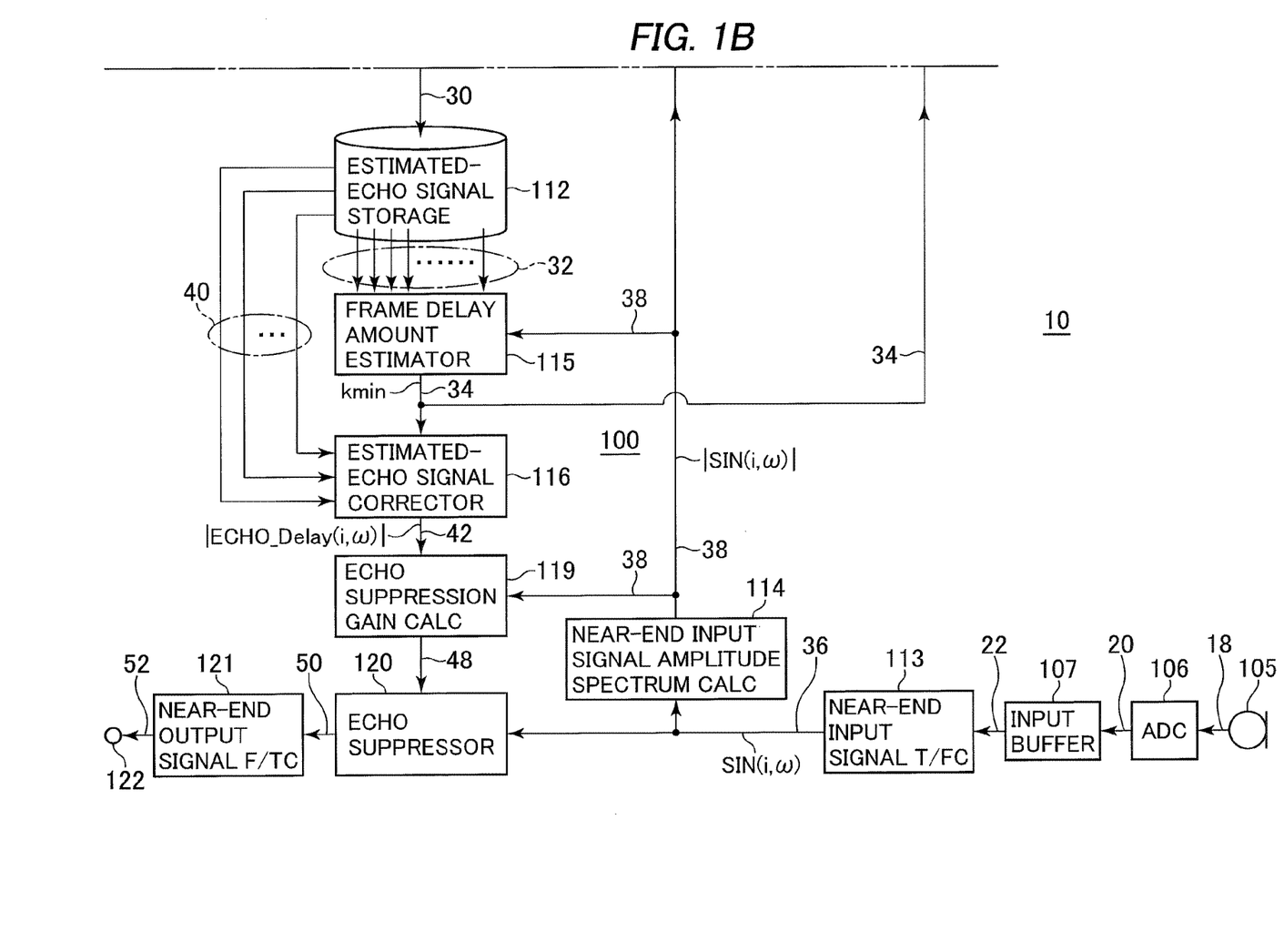

With reference to FIGS. 1A and 1B, the schematic configuration of the echo-suppressing apparatus 100 of the illustrative embodiment will be described. The echo-suppressing apparatus 100 has echo-suppressing circuitry which can solve the problems encountered with the afore-cited C. Faller et al., and appropriately function to suppress echoes included in near-end signals even when part of a far-end signal may propagate over the space on the near-end side and caught by a microphone 105, FIG. 1B, as an acoustic echo signal.

The echo-suppressing apparatus 100 of the instant embodiment may be implemented in the form of dedicated circuit board. Alternatively, the echo-suppressing apparatus 100 may be implemented by echo suppression program sequences stored in a digital signal processor (DSP) or by a central processor unit (CPU) and program sequences controlling the CPU for echo suppression. Still alternatively, the echo-suppressing apparatus 100 may be implemented by a processor system including a CPU, a memory and echo suppression tactics designed in accordance with the embodiment to be stored in the memory. Such program sequences may be stored in a non-transitory computer-readable recording medium in order to control a processor system, when the program sequences are installed on and executed by the system, to function as an echo-suppressing apparatus. In any event, the echo-suppressing apparatus 100 can be functionally represented as shown in FIGS. 1A and 1B.

In accordance with the illustrative embodiment, the loudspeaker-assisted conference system 10 may generally include, in addition to the echo-suppressing apparatus 100 and microphone 105, an output buffer 102, a digital-to-analog (D/A) converter (DAC) 103, a loudspeaker 104, an analog-to-digital (A/D) converter (ADC) 106 and an input buffer 107, which are interconnected as shown in FIGS. 1A and 1B. The echo-suppressing apparatus 100 generally comprises a far-end signal input port 101, a far-end signal time-to-frequency domain converter (T/FC) 108, a far-end signal amplitude spectrum calculator 109, an echo path characteristic updater 110, an estimated-echo signal calculator 111, an estimated-echo signal storage 112, a near-end input signal time-to-frequency domain converter 113, a near-end input signal amplitude spectrum calculator 114, a frame delay amount estimator 115, an estimated-echo signal corrector 116, a far-end signal storage 117, an echo path characteristic calculator 118, an echo suppression gain calculator 119, an echo suppressor 120, a near-end output signal frequency-to-time domain converter (F/TC) 121, and a near-end signal output port 122, which are interconnected as depicted.

The far-end signal input port 101, FIG. 1A, may be connected to a telecommunications network, not shown, such as an Internet protocol (IP) network and/or over radio waves over a wireless network such as cellular phone network to receive a far-end signal 12, which may be an acoustic digital signal sent from a party on the phone on the far-end side, a far-end signal is received in the form of digital sound signal. Signals and data will be designated with reference numerals allotted on connections on which they appear.

The output buffer 102, FIG. 1A, serves as a queue for use in temporarily storing far-end signals received on the far-end signal input port 101. Once the D/A converter 103 is ready for D/A converter of the far-end signals, the output buffer 102 outputs the far-end signals 14 to the D/A converter 103.

The D/A converter 103 functions as converting the far-end signal, i.e. digital sound signal, 14 outputted from the output buffer 102 into a corresponding analog sound signal 16 to provide the analog signal 16 to the loudspeaker 104. The loudspeaker 104 is arranged to convert the electric analog sound signal 16 into audible sound in order to emit the latter to the near-end environment.

Now, the microphone 105, FIG. 1B, is arranged to catch analog sound that may include, e.g. voice uttered by the talker on the near-end side, environmental sounds and acoustic echo to produce a corresponding analog sound. Such acoustic echo may be caused by, e.g. part of analog sound emitted from the loudspeaker 104, propagating over the space around the near-end side to be caught by the microphone 105. The microphone 105 converts the received analog sound signal into a corresponding analog electric signal 18 to feed the A/D converter 106 with the latter signal.

The A/D converter 106, FIG. 1B, is adapted to convert the analog electric signal 18 fed from the microphone 105 into a corresponding digital sound signal to provide the digital signal 20 to the input buffer 107.

The input buffer 107, FIG. 1B, serves as another queue for use in temporarily storing the digital sound signal 20 provided from the A/D converter 106. Once the echo-suppressing apparatus 100 is ready for processing a digital sound signal 22, the input buffer 107 develops the digital sound signal 22 to the near-end input signal time-to-frequency domain converter (T/FC) 113.

Returning to FIG. 1A, the far-end signal time-to-frequency domain converter 108 is adapted to perform time domain-to-frequency domain conversion on the far-end signal 12 received on the far-end signal input port 101 to produce the frequency spectrum of the far-end signal 12. The time domain-to-frequency domain conversion may be implemented by, for example, the fast Fourier transform (FFT). The far-end signal time-to-frequency domain converter 108 outputs data representative of the resultant frequency spectrum 24 of the far-end signal 12 to the far-end signal amplitude spectrum calculator 109.

The far-end signal amplitude spectrum calculator 109, FIG. 1A, is adapted to use the frequency spectrum 24 of the far-end signal delivered from the far-end Signal time-to-frequency domain converter 108 to calculate the amplitude spectrum 26 of the far-end signal. The far-end signal amplitude spectrum calculator 109 outputs data representing the calculated amplitude spectrum 26 of the far-end signal 12 to the estimated-echo signal calculator 111 and the far-end signal storage 117.

The echo path characteristic updater 110 updatably stores therein data of an echo path characteristic that was estimated one frame earlier in its storage, not shown. The echo path characteristic updater 110 is adapted, as will be described later, to use data of an echo path characteristic 46 provided by an echo path characteristic calculator 118 and the echo path characteristic stored therein to update the echo path characteristic thus stored. The echo path characteristic updater 110 outputs the estimated-echo path characteristic data 28 thus stored to the estimated-echo signal calculator 111.

The estimated-echo signal calculator 111 is adapted to calculate the amplitude spectrum of an estimated-echo signal by multiplying the amplitude spectrum 26 of the far-end signal provided from the far-end signal amplitude spectrum calculator 109 by the estimated-echo path characteristic 28 held in the echo path characteristic updater 110. The calculator 111 outputs data of the calculated amplitude spectrum 30 of the estimated-echo signal to the estimated-echo signal storage 112, FIG. 1B.

The estimated-echo signal storage 112 is arranged to store therein, for a predetermined period of time, data of the amplitude spectrum 30 of the estimated-echo signal calculated by the estimated-echo signal calculator 111. The storage 112 provides the frame delay amount estimator 115 with data of the amplitude spectrum 32 of estimated-echo signals of past plural frames in order to cause the estimator 115 to estimate the amount of frame delay. Additionally, the storage 112 is responsive to the amount of frame delay estimated by the frame delay amount estimator 115 to develop data of a frame associated with the amount of frame delay in question 34, which may be referred to as the optimum frame as will be described later, and data 40 of at least one frame which either precedes or follows, or more preferably plural frames which respectively precede and follow, the amount of frame delay 34. The data 40 will be fed to the estimated-echo signal corrector 116.

The near-end input signal time-to-frequency domain converter 113 is adapted to perform time domain-to-frequency domain conversion on the digital sound signal 22 outputted from the input buffer 107 as the near-end input signal to produce the frequency spectrum 36 of the near-end input signal 22. The near-end input signal time-to-frequency domain converter 113 may be implemented by, for example, the FFT. The near-end input signal time-to-frequency domain converter 113 outputs data representative of the resultant frequency spectrum 36 of the near-end input signal 22 to the near-end input signal amplitude spectrum calculator 114 and the echo suppressor 120.

The near-end input signal amplitude spectrum calculator 114 is adapted to use the frequency spectrum 36 of the near-end input signal 22 delivered from the near-end input signal time-to-frequency domain converter 113 to calculate the amplitude spectrum 22 of the near-end input signal to output data of the calculated amplitude spectrum 38 of the near-end input signal 22 to the echo path characteristic calculator 118 shown in FIG. 1A, frame delay amount estimator 115 and echo suppression gain calculator 119 shown in FIG. 1B.

The frame delay amount estimator 115 is adapted to calculate, frame by frame, an error between the amplitude spectrum 32 of the estimated-echo signal of the past several frames held in the estimated-echo signal storage 112 and the amplitude spectrum 38 of the near-end input signal obtained by the near-end input signal amplitude spectrum calculator 114. The estimator 115 determines a frame which has its total of errors minimal in amplitude spectrum between the near-end input signal and the past estimated-echo signals to output data 34 representative of the amount of frame delay thus determined to the estimated-echo signal corrector 116, FIG. 1B, and the far-end signal storage 117, FIG. 1A. A frame associated with that amount of frame delay 34 may be referred to as the optimum frame.

The estimated-echo signal corrector 116 is adapted for delaying estimated-echo signals by the amount of frame delay 34 obtained by the frame delay amount estimator 115 and past estimated-echo signals 40 of plural frames respectively preceding and following the optimum frame read out from the estimated-echo signal storage 112, and correcting the amplitude spectrum of the estimated-echo signal based on the past estimated-echo signals 40 of the frames read out. The corrector 116 transfers the delay estimated-echo signal 42 to the echo suppression gain calculator 119.

Returning to FIG. 1A, the far-end signal storage 117 is arranged to hold data of the amplitude spectrum 26 of the far-end signal 12 calculated by the far-end signal amplitude spectrum calculator 109 for a predetermined period of time, which may be substantially equal to the predetermined period of time set for the estimated-echo signal storage 112 as described earlier. The estimated-echo signal 30 may be stored in the estimated-echo signal storage 112 in such a fashion that data of the amplitude spectrum 26 of the far-end signal 12 are stored in connection with the same frames as an estimated-echo signal being stored in an estimated-echo signal buffer 201, FIG. 2, of the estimated-echo signal storage 112. The storage 117 is also supplied with the data representing the amount of frame delay 34. The storage 117 outputs the amplitude spectrum 44 of the far-end signal 12 delayed by the amount of frame delay estimated by the frame delay amount estimator 115 to the echo path characteristic calculator 118.

The echo path characteristic calculator 118 is adapted for receiving the data of the amplitude spectrum 38 of the near-end input signal 22 from the near-end input signal amplitude spectrum calculator 114 and the amplitude spectrum 44 of the delayed far-end signal from the far-end signal storage 117, and calculates echo path characteristic. The calculator 118 outputs data of the obtained echo path characteristic 46 to the echo path characteristic updater 110.

With reference again to FIG. 1B, the echo suppression gain calculator 119 calculates an echo suppression gain from the amplitude spectrum 38 of the near-end input signal 22 obtained by the near-end input signal amplitude spectrum calculator 114 and from the amplitude spectrum 42 of the delay estimated-echo signal outputted from the estimated-echo signal corrector 116 to deliver the calculated echo suppression gain 48 to the echo suppressor 120.

The echo suppressor 120 is adapted for multiplying the echo suppression gain 48 calculated by the echo suppression gain calculator 119 by the frequency spectrum 36 of the near-end input signal 22 obtained by the near-end input signal time-to-frequency domain converter 113 to thereby obtain the frequency spectrum of a signal having acoustic echo signals suppressed which were included in the frequency spectrum 36 of the near-end input signal 22. The echo suppressor 120 outputs the frequency spectrum 50 of the near-end input signal having the acoustic echo signals suppressed as data representative of the frequency spectrum of the near-end output signal to the near-end output signal frequency-to-time domain converter (F/TC) 121.

The near-end output signal frequency-to-time domain converter 121 serves to perform frequency domain-to-time domain conversion on the frequency spectrum. 50 outputted from the echo suppressor 120 to produce the digital sound signal 52. The near-end output signal frequency-to-time domain converter 121 may be implemented by, for example, an appropriate conversion, such as inverse FFT (IFFT). The near-end output signal frequency-to-time domain converter 121 outputs data representative of the resultant digital sound signal 52 to the near-end signal output port 122, the sound signal 52 being ultimately transmitted as a near-end signal to the far-end party on the phone.

The near-end signal output port 122 may be connected to the telecommunications network, not shown, to transmit the near-end signal from the near-end output signal frequency-to-time domain converter 121 to the far-end party on the phone over the network.

Now, with reference to FIG. 2, the internal structure of the estimated-echo signal storage 112 will be described. The estimated-echo signal storage 112 comprises the buffer 201 for temporarily storing the estimated-echo signal.

The estimated-echo signal buffer 201 serves as temporarily storing an estimated-echo signal for a predetermined period of time, and providing the estimated-echo signal thus stored to the frame delay amount estimator 115 and estimated-echo signal corrector 116. The buffer 201 stores therein frames which are the amplitude spectra represented by amplitude values at different frequencies, and each of which has a different frame number that increments with the passage of time.

Figure 3:
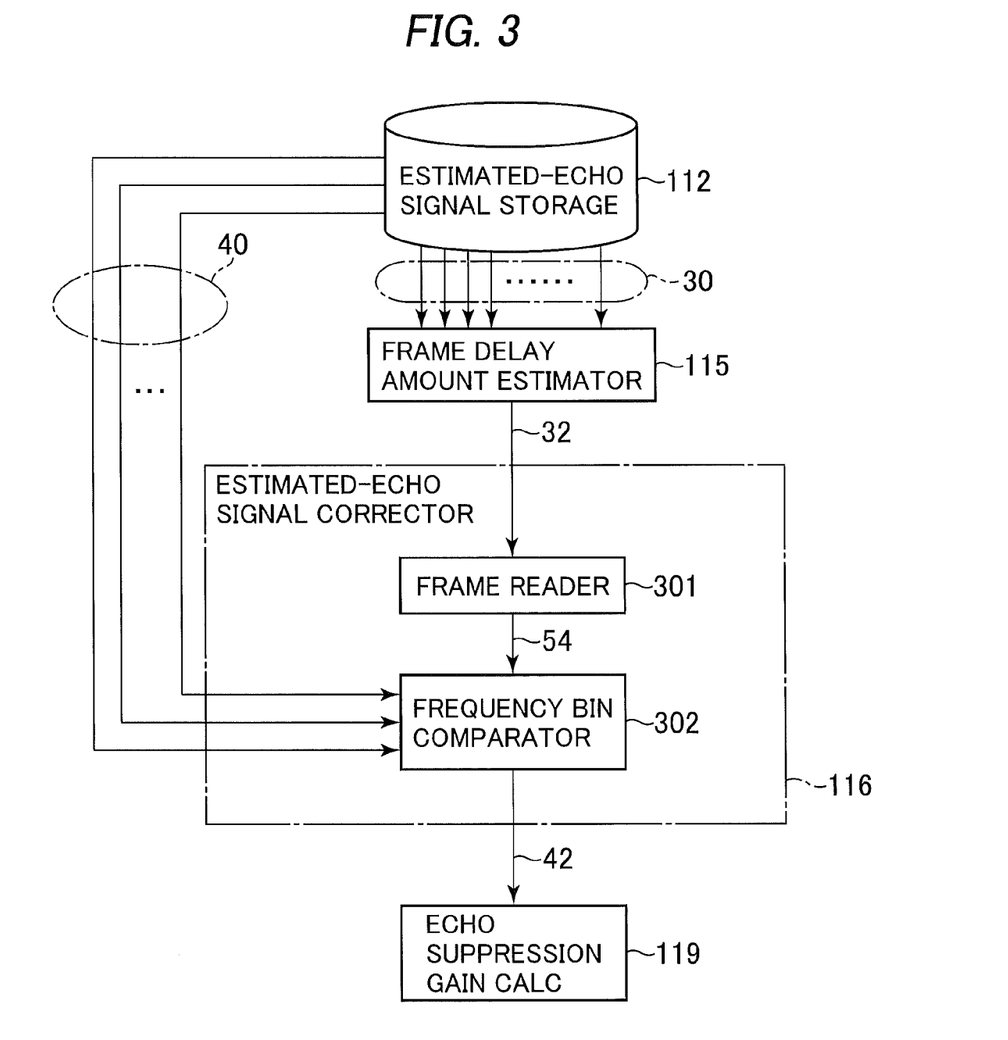
FIG. 3 is a schematic block diagram showing the internal configuration of the estimated-echo signal calculator shown in FIG. 1B together with components associated therewith.

With reference to FIG. 3, the estimated-echo signal corrector 116 comprises a frame reader 301 and a frequency bin comparator 302.

The frame reader 301 functions to read out the optimum frame in which an error in amplitude spectrum between the near-end input signal and the past estimated-echo signals is minimal, as well as frames respectively preceding and following the optimum frame. The frame reader 301 outputs the frames 54 thus read out to the frequency bin comparator 302.

The frequency bin comparator 302 functions to compare the frames 54 read out by the frame reader 301 for each frequency bin to correct, more specifically delay, the estimated-echo signal to produce a corrected, estimated-echo signal 42 to the echo suppression gain calculator 119.

Figure 4:
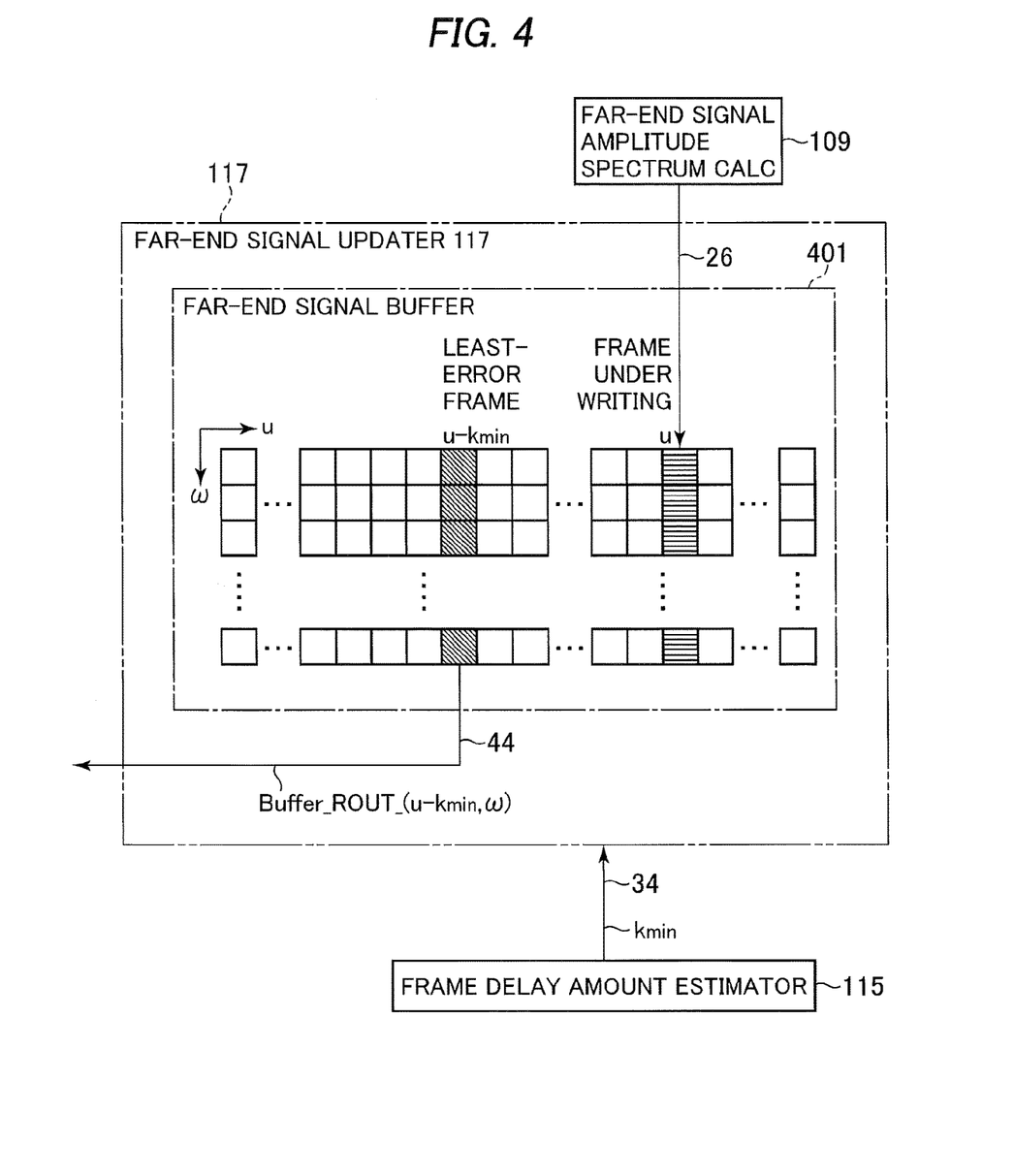
FIG. 4 is a schematic block diagram showing the internal configuration of the far-end signal storage shown in FIG. 1A.

With reference to FIG. 4, the far-end signal storage 117 includes a far-end signal buffer 401. The far-end signal buffer 401 is arranged to temporarily hold the far-end signal for a predetermined period of time to output the far-end signal 44, representing a held amplitude spectrum, to the echo path characteristic calculator 118. As with the estimated-echo signal buffer 201 described previously, the far-end signal buffer 401 stores therein the frames which are amplitude spectra represented by amplitude values at various frequencies, and each of which has its frame number specific thereto and incrementing with the passage of time.

Now, the operation of the echo-suppressing apparatus 100 of the present embodiment will be described from the start of preparing for echo suppression to suppressing echoes.

As described earlier, the far-end signal input port 101 is connected to the telecommunications network, not shown. When the echo-suppressing apparatus 100 is rendered operative, the input port 101 may receive a digital sound signal, such as speech signal on the far-end side and/or environmental sounds, as a far-end signal over the telecommunications network.

The far-end signal entering on the far-end signal input port 101 is supplied to the output buffer 102. The output buffer 102 temporarily stores the far-end signal. As soon as the D/A converter 103 makes its preparation, far-end signals 14 held in the output buffer 102 are successively outputted to the D/A converter 103.

The D/A converter 103 converts the far-end signal i.e. digital sound signal, outputted from the output buffer 102 into a corresponding electric analog sound signal 16, which is in turn transferred to the loudspeaker 104.

The loudspeaker 104 receives the electrical analog sound signal 16 from the D/A converter 103, and converts the electric analog sound signal 16 into corresponding audible sound to emit the latter to the near-end environment.

The microphone 105 receives analog sound containing several kinds of sounds as described earlier, and outputs an electric analog signal 18 representative of the received analog sound to the A/D converter 106.

The A/D converter 106 converts the electric analog sound signal outputted from the microphone 105 into a corresponding digital sound signal, and outputs the resulting digital sound signal 20 to the input buffer 107.

The input buffer 107 temporarily stores the digital sound signal 20 outputted from the A/D converter 106. As soon as the echo-suppressing apparatus 100 makes its preparation, the input buffer 107 outputs the digital sound signal 22 as a near-end signal to the near-end signal time-to-frequency domain converter 113.

In the far-end Signal time-to-frequency domain converter 108, the far-end signal 12 applied on the far-end signal input port 101 is converted as a far-end signal into a frequency spectrum 24 by the FFT in the instant embodiment. The resulting frequency spectrum 24, ROUT (i, ω), of the far-end signal 12 is outputted to the far-end signal amplitude spectrum calculator 109.

The far-end signal amplitude spectrum calculator 109 calculates out the amplitude spectrum 26, |ROUT(i,ω)|, of the far-end signal 12 in accordance with Expression (1) using the frequency spectrum 24, ROUT(i,ω), of the far-end signal 12 outputted from the far-end Signal time-to-frequency domain converter 108.

$$|ROUT(i,\omega)| = \sqrt{(ROUT\_real(i,\omega))^2 + (ROUT\_image(i,\omega))^2}, \quad (1)$$

where the terms ROUT_real(i,ω) and ROUT_image(i,ω) indicate the amplitude components of the real and imaginary parts, respectively, of a frequency spectrum 26 of a far-end signal 12 of a frequency bin ω in a frame i, which is a natural number. The frequency spectrum 24, ROUT(i,ω), of the far-end signal 12 can be given by Expression (2).

$$ROUT(i,\omega) = ROUT\_real(i,\omega) + j \cdot ROUT\_image(i,\omega), \quad (2)$$

where j is the imaginary unit. The amplitude spectrum 26, |ROUT(i,ω)|, of the frequencies of the far-end signal 12 obtained by the far-end signal amplitude spectrum calculator 109 is outputted to the estimated echo calculator 111 and far-end signal storage 117.

The estimated-echo signal calculator 111 calculates the amplitude spectrum 30, |ECHO(i, ω)| of the estimated-echo signal, using Expression (3), from the estimated-echo path characteristic 28, |H(i,ω)|, held in the echo path characteristic updater 110 and the amplitude spectrum 26, |ROUT(i, ω)|, of the far-end signal 12 from the far-end signal amplitude spectrum calculator 109. In particular, the estimated-echo signal calculator 111 multiplies the amplitude spectrum 26, |ROUT(i,ω)|, of the far-end signal 12 by a frequency bin corresponding to the estimated-echo path characteristic 28, |H(i,ω)|, held in the echo path characteristic updater 110, thus obtaining the amplitude spectrum 30, |ECHO (i,ω)|, of the estimated-echo signal of this frequency bin.

$$|ECHO(i,\omega)| = |H(i,\omega)| \cdot |ROUT(i,\omega)| \quad (3)$$

The amplitude spectrum 30, |ECHO(i,ω)|, of the estimated-echo signal obtained by the estimated-echo signal calculator 111 is provided to the estimated-echo signal buffer 201 of the estimated-echo signal storage 112.

The estimated-echo signal storage 112 stores the amplitude spectrum 30, |ECHO(i,ω)|, of the estimated-echo signal from the estimated-echo signal calculator 111 into the estimated-echo signal buffer 201. This storing may be represented by Expression (4).

$$Buffer(u,\omega) = |ECHO(i,\omega)|, \quad (4)$$

where a variable u is a natural number representing the number of a frame in the buffer 201. The expression means that, once the estimated-echo signal calculator 111 obtains the amplitude spectrum 30, |ECHO(i,ω)|, of the estimated-echo signal, the amplitude spectrum 30 is stored with the frame number u in the buffer 201.

Multiple frames of amplitude spectra of past estimated-echo signals are stored in the estimated-echo signal buffer 201 (Buffer (u,ω)). For example, if the storage capacity of the buffer 201 is sufficient to store 100 frames, the amplitude spectra of estimated-echo signals of past 100 frames can be stored. Upon an estimated-echo signal being stored with frame number u allotted, the frame number u is incremented by one. If the number of frames would increase beyond the storage capacity of the buffer 201, for example, when the frame number u reaches or exceeds "100" in a case where the capacity of the buffer 201 is sufficient to store 100 frames, an initial value, e.g. zero, is substituted into the frame number u so as to enable estimated-echo signals to be stored into the buffer 201 again from the beginning.

A digital sound signal outputted from the input buffer 107 as a near-end input signal will next be described. The near-end input signal time-to-frequency domain converter 113 converts the digital sound signal 22 fed from the input buffer 107 as a near-end input signal into the frequency spectrum 36 by the FFT with the instant illustrative embodiment. The resulting frequency spectrum 36, SIN(i,ω), of the near-end input signal 22 is provided to the near-end input signal amplitude spectrum calculator 114 and echo suppressor 120.

The near-end input signal amplitude spectrum calculator 114 uses the frequency spectrum 36, SIN(i,ω), of the near-end input signal 22 outputted from the near-end input signal time-to-frequency domain converter 113 to calculate the amplitude spectrum 38, |SIN(i,ω)|, of the near-end input signal 22 in accordance with Expression (5).

$$|SIN(i\omega)| = \sqrt{(SIN\_real(i,\omega))^2 + SIN\_image(i,\omega))^2}, \quad (5)$$

where the terms SIN_real (i,ω) and SIN_image (i,ω) indicate the amplitude components of the real and imaginary parts, respectively, of the frequency spectrum 38 of the near-end input signal 22 of a frequency bin ω in a frame i.

The frequency spectrum 36, SIN(i,ω), of the near-end input signal can be given by Expression (6).

$$SIN(i,\omega)=SIN\_real(i,\omega)+j\cdot SIN\_image(i,\omega), \quad (6)$$

The amplitude spectrum 38, |SIN(i,ω)|, of the near-end input signal 22 obtained by the near-end input signal amplitude spectrum calculator 114 is outputted to the frame delay amount estimator 115, echo path characteristic calculator 118 and echo suppression gain calculator 119.

The frame delay amount estimator 115 obtains the amplitude spectrum 32, Buffer (u−k,ω), where k=1, 2, . . . , N, of the amplitude spectrum of the estimated-echo signal of past plural frames outputted from the buffer 201 of the estimated-echo signal storage 112 and the amplitude spectrum 38, |SIN(i,ω)|, of the near-end input signal from the near-end input signal amplitude spectrum calculator 114, and calculates, frame by frame, the total of differences in each frequency bin for using Expression (7).

$$\text{Error}(k) = \sum_{\omega=0}^{Fs/2} (|SIN(i,\omega)| - \text{Buffer}(u-k,\omega)), \quad (7)$$

where Fs is a sampling frequency, and Error(k) is an error, which is the total of differences in each frequency bin between the amplitude spectrum 38, |SIN(i,ω)|, of the near-end input signal and the amplitude spectrum 32, Buffer (u−k,ω), of a past estimated-echo signal. The expression means that the error is calculated for each frame between the amplitude spectrum 32, Buffer (u−k,ω), of the estimated-echo signal in a past number k of frames and the amplitude spectrum 38, |SIN (i,ω)|, of the near-end input signal. The errors in each frame are thus obtained. The frame delay amount estimator 115 obtains the errors in each frame in accordance with Expression (8) to determine the amount of frame delay 34, $k_{min}$, at which the errors are minimum.

$$k_{min} = \arg\min_{1 \leq k \leq N}(\text{Error}(k)), \quad (8)$$

where the term, arg min(x(k)) in general form, is a function providing an argument that minimizes x(k). Specifically, Expression (8) indicates that the amount of frame delay 34 minimizing the error, Error(k), is outputted to be substituted into $k_{min}$. The frame delay amount estimator 115 outputs the amount of frame delay $k_{min}$ that minimizes the errors to the estimated-echo signal corrector 116 and far-end signal storage 117.

Figure 2:
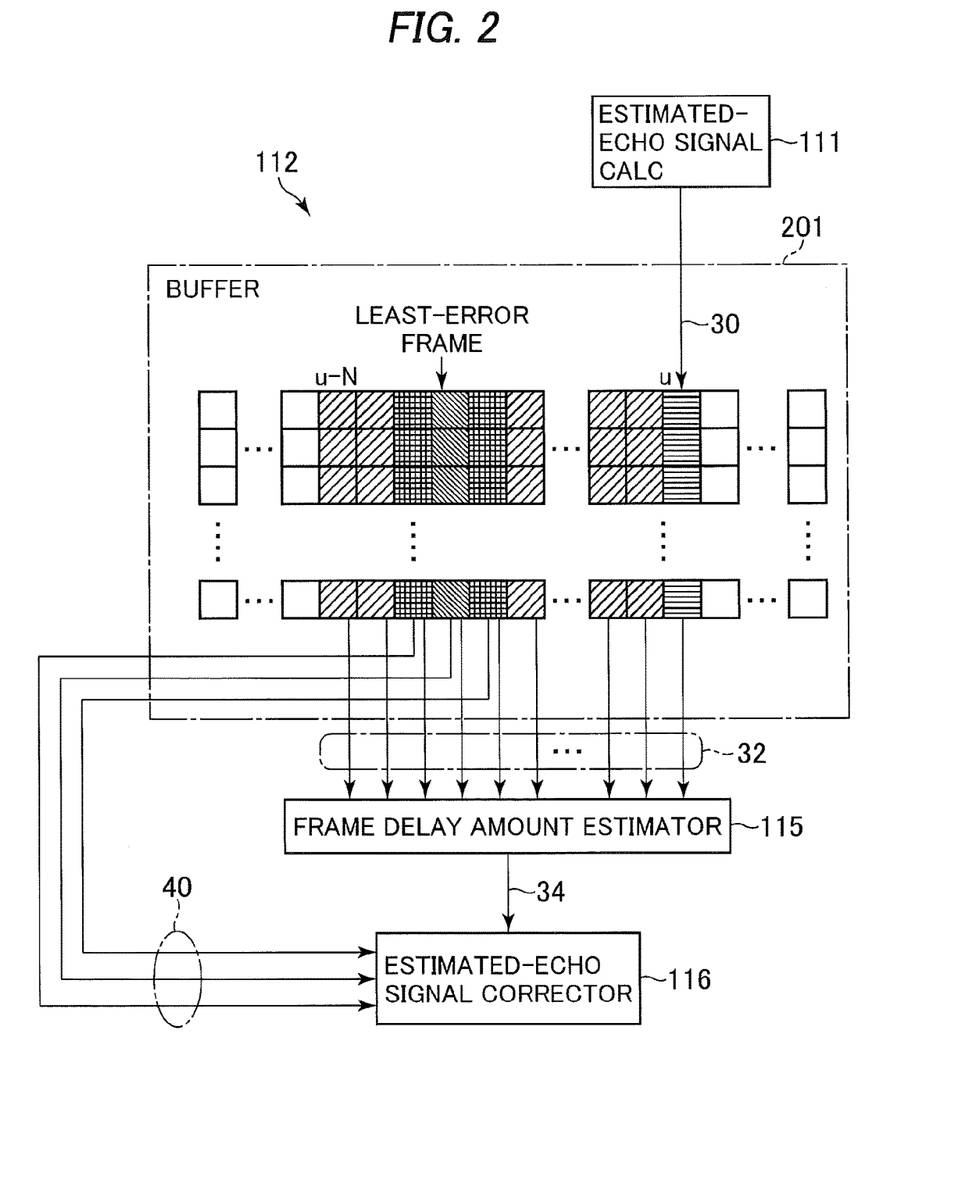
FIG. 2 is a schematic block diagram showing the internal configuration of the estimated-echo signal storage shown in FIG. 1B together with components associated therewith.

In the estimated-echo signal corrector 116, the frame reader 301, FIG. 3, uses the amount of frame delay $k_{min}$ thus provided from the frame delay amount estimator 115 to make access to the buffer 201, FIG. 2, of the estimated-echo signal storage 112 to read out the amplitude spectrum 30, |ECHO(i,ω)|, of the estimated-echo signal, the optimum frame, Buffer(u−$k_{min}$, ω), i.e. the frame having its error minimal, and plural frames, Buffer (u−($k_{min}$±m),ω), respectively preceding and following the optimum frame. For example, in a system where each one frame is taken just before and after the optimum frame, m=−1 and 1. The frequency bin comparator 302 compares them for each frequency bin such as to determine, for example, an estimated-echo signal in a frame having its value maximum among the past estimated-echo signals 40 of the frames read out as the amplitude spectrum 42, |ECHO_Delay(i,ω)| of the delay estimated-echo signal.

$$|\text{ECHO\_Delay}(i,\omega)|=\max_{-M \leq m \leq M}(\text{Buffer}-(u-(k_{min}+m),\omega))) \quad (9)$$

Once the estimated-echo signal corrector 116 thus delays and corrects the amplitude spectrum 42, |ECHO_Delay(i,ω)|, of the delay estimated-echo signal, it delivers the determined amplitude spectrum 42 to the echo suppression gain calculator 119.

To the frequency bin comparator 302 of the delay estimated-echo signal corrector 116, applicable are various methods of correcting estimated-echo signals. For example, an estimated-echo signal may be formed by the average value with respect to the optimum frame having its error minimum and plural frames respectively preceding and following the optimum frame.

In the far-end signal storage 117, the amplitude spectrum 26, |ROUT(i,ω)|, of the far-end signal 12 is stored by the far-end signal amplitude spectrum calculator 109 with the frame number u that is the same as the estimated-echo signal storage 112, which may be expressed by Expression (10).

$$\text{Buffe\_ROUT}(u,\omega)=|\text{ROUT}(i,\omega)| \quad (10)$$

The far-end signal buffer 401, i.e. Buffer_ROUT (u,ω), has multiple frames of amplitude spectra of past far-end signals 12 kept stored therein. For example, as described earlier, in an application where the far-end signal buffer 401 has its storage capacity sufficient to store 100 frames, the amplitude spectra of far-end signals 12 of past 100 frames can be stored. When a far-end signal is written into the frame having its frame number u, the frame number u is incremented by one. If the frame number would be incremented beyond the storage capacity of the far-end signal buffer 401, namely "100" in the example set forth above, the count of the frame number u is initialized to its initial value, i.e. zero in the above example, so that estimated-echo signals will be stored into the far-end signal buffer 401 again from the beginning.

The far-end signal storage 117 receives the amount of frame delay 34, $k_{min}$, that is obtained from the frame delay amount estimator 115, and outputs the amplitude spectrum 44, |ROUT_Delay(i,ω)|, of the delayed far-end signal to the echo path characteristic calculator 118.

$$|\text{ROUT\_Delay}(i,\omega)|=\text{Buffer\_ROUT}(u-k_{min},\omega) \quad (11)$$

The echo path characteristic calculator 118 uses Expression (12) to calculate echo path characteristic, |H1(i,ω)| from the amplitude spectrum 44, |ROUT_Delay(i,ω)|, of the delayed far-end signal outputted from the far-end signal storage 117 and from the amplitude spectrum 38, |SIN(i,ω)|, of the near-end input signal outputted from the near-end input signal amplitude spectrum calculator 114.

$$|H1(i,\omega)| = \frac{|SIN(i,\omega)|}{|\text{ROUT\_Delay}(i,\omega)|} \quad (12)$$

The echo path characteristic calculator 118 delivers the echo path characteristic 46, |H(i,ω)|, to the echo path characteristic updater 110.

The echo path characteristic updater 110 uses the echo path characteristic 46 derived from the echo path characteristic calculator 118 and the echo path characteristic held therein before frame to update the echo path characteristic by means of, e.g. a time constant filter defined by Expression (13).

$$|H(i+1,\omega)|=(1-a)\cdot|H(i,\omega)|+a\cdot|H(i,\omega)| \quad (13)$$

The echo suppression gain calculator 119 obtains the amplitude spectrum 38, |SIN(i,ω)|, of the near-end input signal from the near-end input signal amplitude spectrum calculator 114 and the value |ECHO_Delay(i,ω)| from the delay estimated-echo signal corrector 116 to calculate the echo suppression gain 48 G(i,ω) using Expression (14).

$$G(i, \omega) = \frac{|SIN(i, \omega)| - |ECHO\_Delay(i, \omega)|}{|SIN(i, \omega)|} \quad (14)$$

The echo suppression gain calculator 119 outputs the echo suppression gain 48, G(i,ω), to the echo suppressor 120. The echo suppressor 120 obtains the real part, SIN_real (i,ω), and the imaginary part, SIN_image(i,ω), of the frequency spectrum 36, SIN(i,ω), of the near-end input signal 22 from the near-end input signal time-to-frequency domain converter 113. The echo suppressor 120 multiplies the frequency spectrum 36, SIN(i,ω), of the near-end input signal by the echo suppression gain 48, G(i,ω), as defined by Expressions (15) and (16), to obtain a frequency spectrum 50, SOUT(i,ω), of the near-end output signal, from which acoustic echo signals contained in the frequency spectrum 36, SIN(i,ω), of the near-end input signal 22 have been suppressed.

$$SOUT\_real(i,\omega)) = G(i,\omega)) \cdot SIN\_real(i,\omega)) \quad (15)$$

$$SOUT\_image(i,\omega)) = G(i,\omega)) \cdot SIN\_image(i,\omega)) \quad (16)$$

where SOUT_real(i,ω) and SOUT_image(i,ω) indicate the amplitude components of the real and imaginary parts, respectively, of the frequency spectrum of the near-end output signal at the frequency bin ω in a frame i. The frequency spectrum 50, SOUT(i,ω), of the near-end output signal can be given by:

$$SOUT(i,\omega) = SIN\_real(i,\omega) + j \cdot SIN\_image(i,\omega). \quad (17)$$

The echo suppressor 120 produces the frequency spectrum 50, SOUT (i,ω), of the near-end output signal having acoustic echo signals suppressed to the near-end output signal frequency-to-time domain converter 121.

The near-end output signal frequency-to-time domain converter 121 converts the frequency spectrum 50, SOUT (i,ω), of the near-end output signal outputted from the echo suppressor 120 into a signal in the time domain by the IFFT in this example to issue the resultant digital sound signal in the form of near-end output signal 52 on the near-end signal output port 122.

From the near-end signal output port 122, the digital sound signal 52 thus provided from the near-end output signal frequency-to-time domain converter 121 is transmitted to the far-end side over the telecommunications network connected thereto.

The instant embodiment can yield the following advantageous effects. According to the echo-suppressing apparatus 100 of the embodiment, plural frames are used for correcting an estimated-echo signal, thereby being capable of correctly calculating an estimated-echo signal and an echo suppression gain even when the valleys of frequencies deviate more or less.

More specifically, the echo-suppressing apparatus 100 is adapted to use an estimated-echo path characteristic 28 and a input far-end signal 12 to calculate out an estimated-echo signal, i.e. the amplitude spectrum 30, which is then stored in the buffer 201, and calculate out an error between the far-end input signal 12 and each estimated-echo signal 30 stored in the buffer 201, the error being evaluated so as to obtain a delay estimated-echo signal 42 from the past estimated-echo signal 40 of the optimum frame and frames 40 respectively preceding and following the optimum frame. The echo-suppressing apparatus 100 uses the amplitude spectrum 38 of a near-end input signal 22 and the so-obtained delay estimated-echo signal 42 to obtain an echo suppression gain 48, which is in turn multiplied by the near-end input signal 22 to thereby suppress echo signals included in the near-end input signal 22. Thus, the apparatus 100 can stably suppress echo signals even in an operating environment where the amount of delay is large or the amount of delay greatly fluctuates.

In addition, the echo-suppressing apparatus 100 is adapted to compare in value the past estimated-echo signals 40 of the optimum frame having its error minimum and the frames respectively preceding and following the optimum frame for each frequency bin, and takes the estimated-echo signal 42 in the frame having its value maximum among the supplied estimated-echo signals 40 as a corrected, estimated-echo signal, thereby correcting the estimated-echo signal in each frequency bin to suppress echoes.

The present invention may not be restricted to the above-described embodiment. Modified embodiments as exemplified below are also possible. The above illustrative embodiment is directed to the echo-suppressing apparatus applicable to a telephone terminal for use in loudspeaker-assisted telephone conference systems such as video conference systems or telephone conference systems. The invention may also be applied to other various kinds of telephone terminals such as mobile phone terminals and personal computers acting as softphone.

In addition, the echo-suppressing apparatus of the above-described embodiment has been described as mountable on a telephone terminal. The inventive echo-suppressing apparatus may be implemented in the form of stand-alone unit.

The entire disclosure of Japanese patent application No. 2014-038701 filed on Feb. 28, 2014, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. An echo-suppressing apparatus suppressing from a near-end input signal an acoustic echo signal caused by part of a far-end signal, said apparatus comprising:
   a far-end time-to-frequency domain converter that converts the far-end signal from a time domain to a frequency domain;
   a far-end signal amplitude spectrum calculator configured to receive as an input a frequency spectrum output from the far-end time-to-frequency domain converter and to output a first amplitude spectrum corresponding to the frequency spectrum received from the far-end time-to-frequency domain converter;
   a near-end time-to-frequency domain converter that converts the near-end signal from a time domain to a frequency domain;
   a near-end signal amplitude spectrum calculator configured to receive as an input a frequency spectrum output from the near-end time-to-frequency domain converter and to output a second amplitude spectrum corresponding to the frequency spectrum received from the near-end time-to-frequency domain converter;

an estimated-echo signal storage storing therein a plurality of frames of estimated-echo signals, each of which is obtained by multiplying an echo path characteristic estimated one frame earlier by the first amplitude spectrum for each frame on a time sequence;

a frame delay amount estimator calculating a total of differences between the second amplitude spectrum and each of the estimated-echo signals stored in said estimated-echo signal storage, and determining an amount of frame delay having the total of differences minimal;

a delay estimated-echo signal calculator using the amount of frame delay to read out an optimum frame and a near frame preceding or following the optimum frame for calculating out a corrected, estimated-echo signal; and an echo suppressor using the corrected, estimated-echo signal for suppressing the acoustic echo signal from the near-end input signal.

2. The apparatus in accordance with claim 1, wherein said delay estimated-echo signal calculator obtains the optimum frame and the near frame from said estimated-echo signal storage, and corrects the estimated-echo signal in the optimum and near frames.

3. The apparatus in accordance with claim 1, wherein said delay estimated-echo signal calculator uses in addition to the optimum frame, a plurality of near frames each of which either precedes or follows the optimum frame to calculate out the corrected, estimated-echo signal.

4. A non-transitory computer-readable recording medium having a program recorded which controls, when installed on and executed by a computer, the computer to function as an echo-suppressing apparatus suppressing from a near-end input signal an acoustic echo signal caused by a far-end signal, said apparatus comprising:

a far-end time-to-frequency domain converter that converts the far-end signal from a time domain to a frequency domain;

a far-end signal amplitude spectrum calculator configured to receive as an input a frequency spectrum output from the far-end time-to-frequency domain converter and to output a first amplitude spectrum corresponding to the frequency spectrum received from the far-end time-to-frequency domain converter;

a near-end time-to-frequency domain converter that converts the near-end signal from a time domain to a frequency domain;

a near-end signal amplitude spectrum calculator configured to receive as an input a frequency spectrum output from the near-end time-to-frequency domain converter and to output a second amplitude spectrum corresponding to the frequency spectrum received from the near-end time-to-frequency domain converter;

an estimated-echo signal storage storing therein a plurality of frames of estimated-echo signals, each of which is obtained by multiplying an echo path characteristic estimated one frame earlier by the first amplitude spectrum for each frame on a time sequence;

a frame delay amount estimator calculating a total differences between the second amplitude spectrum and each of the estimated-echo signal stored in the estimated-echo signal storage, and determining an amount of frame delay having the total of differences minimal;

a delay estimated-echo signal calculator using the amount of frame delay to read out an optimum frame and a near frame preceding or following the optimum frame for calculating out a corrected, estimated-echo signal; and an echo suppressor using the corrected, estimated-echo signal for suppressing the acoustic echo signal from the near-end input signal.

5. A method of suppressing from a near-end input signal an acoustic echo signal caused by part of a far-end signal, said method comprising:

converting the far-end signal from a time domain to a frequency domain;

calculating a first amplitude spectrum based on the far-end signal, having been converted to the frequency domain;

converting the near-end signal from a time domain to a frequency domain;

calculating a second amplitude spectrum based on the near-end signal, having been converted to the frequency domain;

multiplying the first amplitude spectrum by an echo path characteristic defining an estimate of an echo path on which the acoustic echo signal has propagated to produce an estimated-echo signal for each frame on a time sequence, and holding a plurality of frames of the estimated-echo signals by an estimated-echo signal storage;

calculating by a delay amount estimator a total of differences between the second amplitude spectrum and the estimated-echo signals held in the estimated-echo signal storage for each frame, and obtaining an amount of frame delay having the total of differences minimal;

using the amount of frame delay to read out an optimum frame and a near frame preceding or following the optimum frame by an estimated-echo signal calculator to calculate out a corrected, estimated-echo signal; and using the corrected, estimated-echo signal to suppress the acoustic echo signal from the near-end input signal by an echo suppressor.

* * * * *